Nov. 30, 1954 W. L. GASKELL 2,695,638
TILTING ARBOR CIRCULAR WOOD SAW
Filed Feb. 17, 1949 5 Sheets-Sheet 1

INVENTOR.
Walter L. Gaskell
BY
Harness, Dickey & Pierce
ATTORNEYS.

Nov. 30, 1954  W. L. GASKELL  2,695,638
TILTING ARBOR CIRCULAR WOOD SAW

Filed Feb. 17, 1949  5 Sheets-Sheet 3

INVENTOR.
Walter L. Gaskell
BY
Barnes, Dickey & Pierce
ATTORNEYS.

Nov. 30, 1954  W. L. GASKELL  2,695,638
TILTING ARBOR CIRCULAR WOOD SAW
Filed Feb. 17, 1949  5 Sheets-Sheet 4
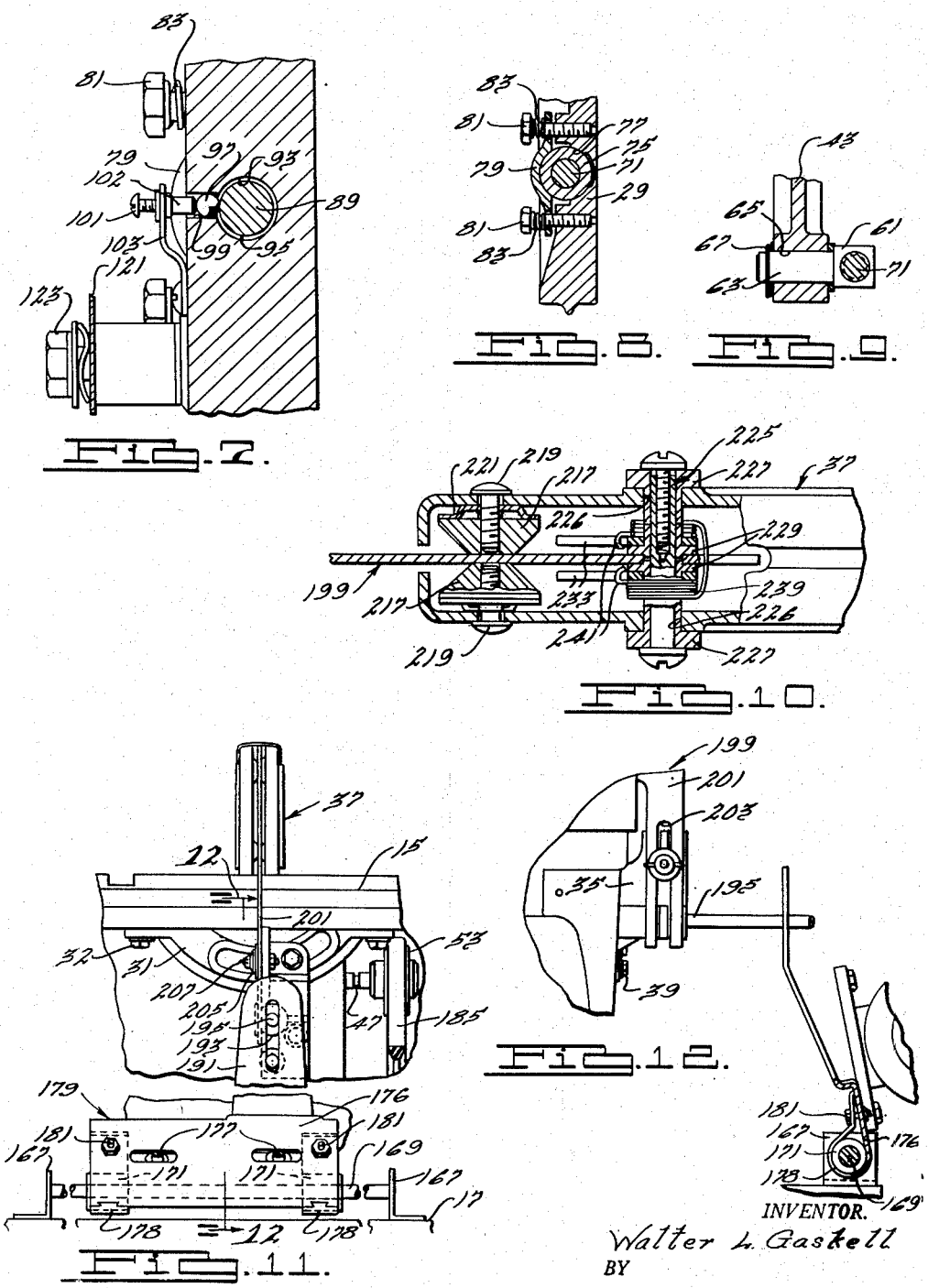
INVENTOR.
Walter L. Gaskell
BY
Harness, Dickey & Pierce
ATTORNEYS.

Nov. 30, 1954  W. L. GASKELL  2,695,638
TILTING ARBOR CIRCULAR WOOD SAW
Filed Feb. 17, 1949  5 Sheets-Sheet 5

INVENTOR.
Walter L. Gaskell
BY
Harness, Dickey & Pierce
ATTORNEYS.

United States Patent Office 2,695,638
Patented Nov. 30, 1954

2,695,638

TILTING ARBOR CIRCULAR WOOD SAW

Walter L. Gaskell, Ypsilanti, Mich., assignor to King-Seeley Corporation, Ann Arbor, Mich., a corporation of Michigan Application February 17, 1949, Serial No. 76,937

5 Claims. (Cl. 143—36)

This invention relates generally to woodworking machines and more particularly to a tilting arbor saw.

It is an object of this invention to provide a tilting arbor saw, having a circular saw blade arbor disposed below the top surface thereof and supported for both vertical and tilting adjustment with respect thereto, and means including a single operating knob and shaft for independently and selectively adjusting the vertical and tilted positions of the arbor.

It is a further object of this invention to provide in an arbor saw of the aforementioned type, simple, novel arbor supporting and adjusting means for selectively permitting independent vertical and angular arbor adjustment to be obtained in a simple and efficient manner by means of a single hand-operated member.

Another object of this invention is to provide, in an arbor saw of the type mentioned, a single handle control for tilting or elevating the saw blade and which is supported from the table top independent of the casing of the saw.

It is a still further object of this invention to provide a tilting arbor saw of the aforementioned type which is simple in construction, relatively inexpensive to manufacture and in which the position of the saw blade relative to the table top may be easily and accurately adjusted to any desired position, in a more simple manner than has been heretofore known in the art.

These and other objects of this invention become apparent from the following detailed description, taken in conjunction with the accompanying drawings, in which:

Fig. 7 is an enlarged fragmentary sectional view of the structure illustrated in Fig. 3, taken along the line 7—7 thereof;

Fig. 8 is an enlarged fragmentary sectional view of the structure illustrated in Fig. 3, taken along the line 8—8 thereof;

Fig. 9 is an enlarged fragmentary sectional view of the structure illustrated in Fig. 3, taken along the line 9—9 thereof;

Fig. 10 is an enlarged fragmentary sectional view of the structure illustrated in Fig. 3, taken along the line 10—10 thereof;

Fig. 11 is a fragmentary rear end elevational view of the structure illustrated in Fig. 1, with parts broken away in section for purposes of clarity and with the motor removed from its motor mounting bracket;

Fig. 12 is a fragmentary sectional view of the structure illustrated in Fig. 11, taken along the line 12—12 thereof;

Figure 1:
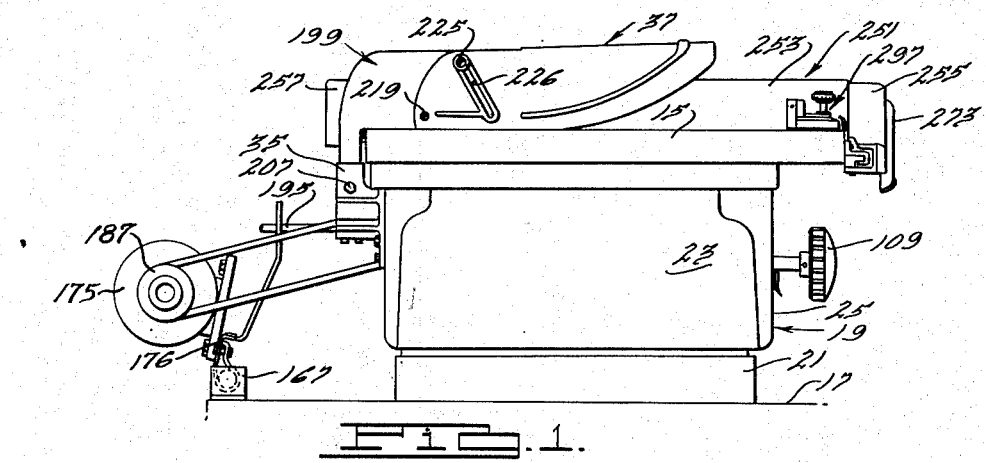
Figure 1 is the side elevational view illustrating the arbor saw of this invention mounted on a supporting surface and having a driving motor connected thereto.
Figure 2:
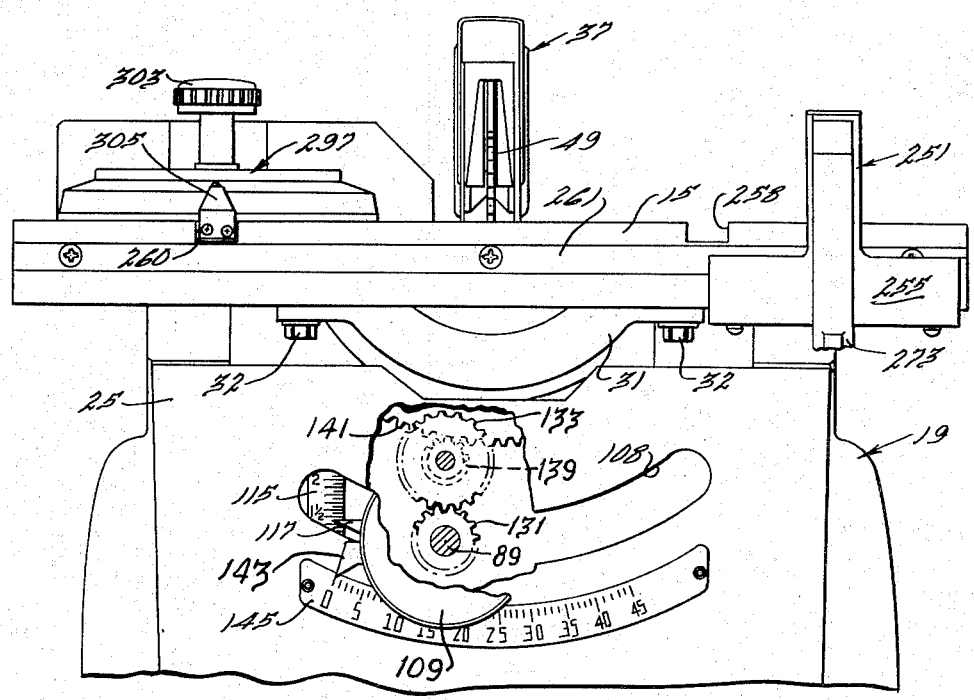
Fig. 2 is an enlarged, fragmentary, front and elevational view of the structure illustrated in Fig. 1.
Figure 3:
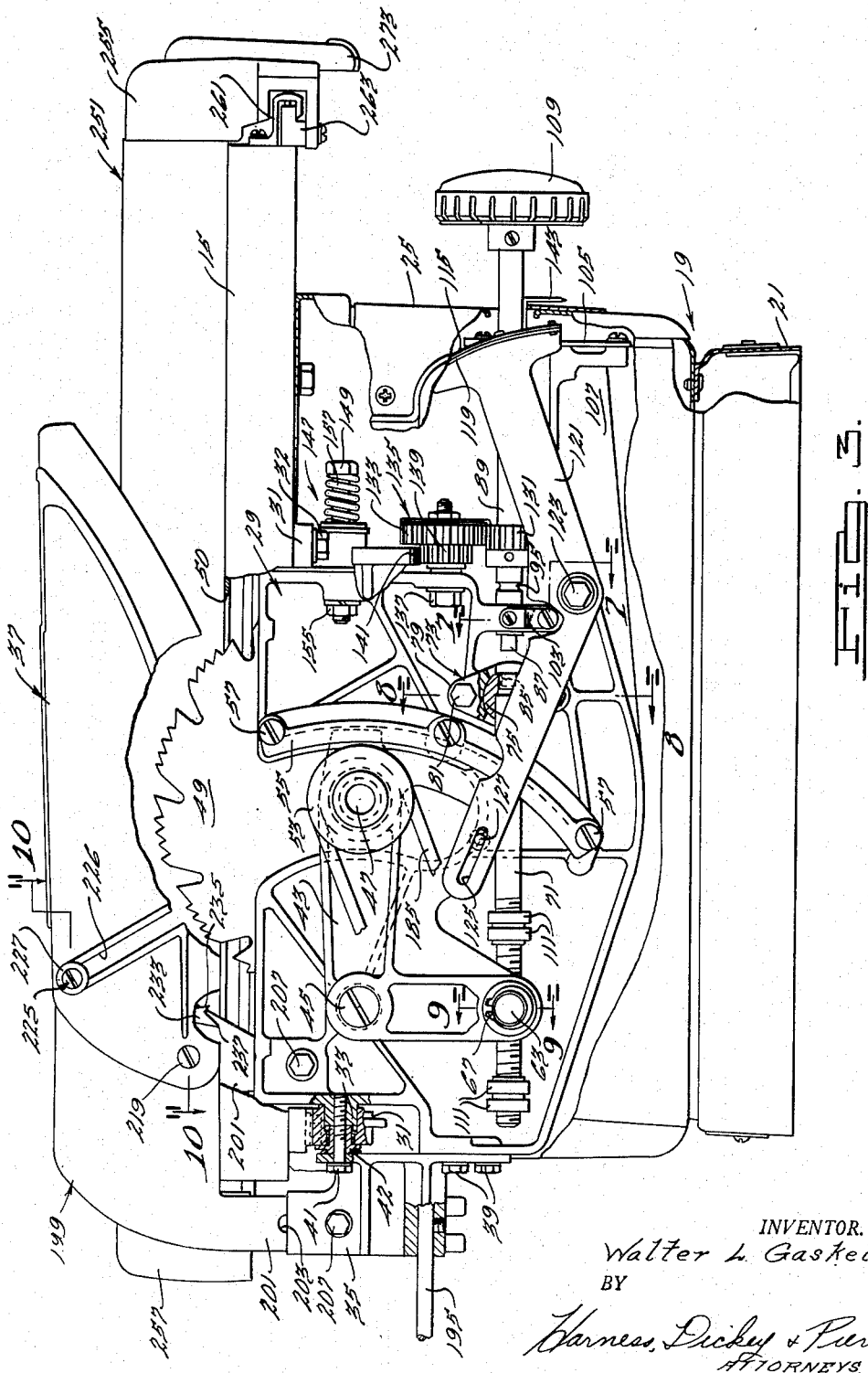
Fig. 3 is an enlarged side elevational view of the arbor saw with parts broken away for purposes of clarity.
Figure 4:
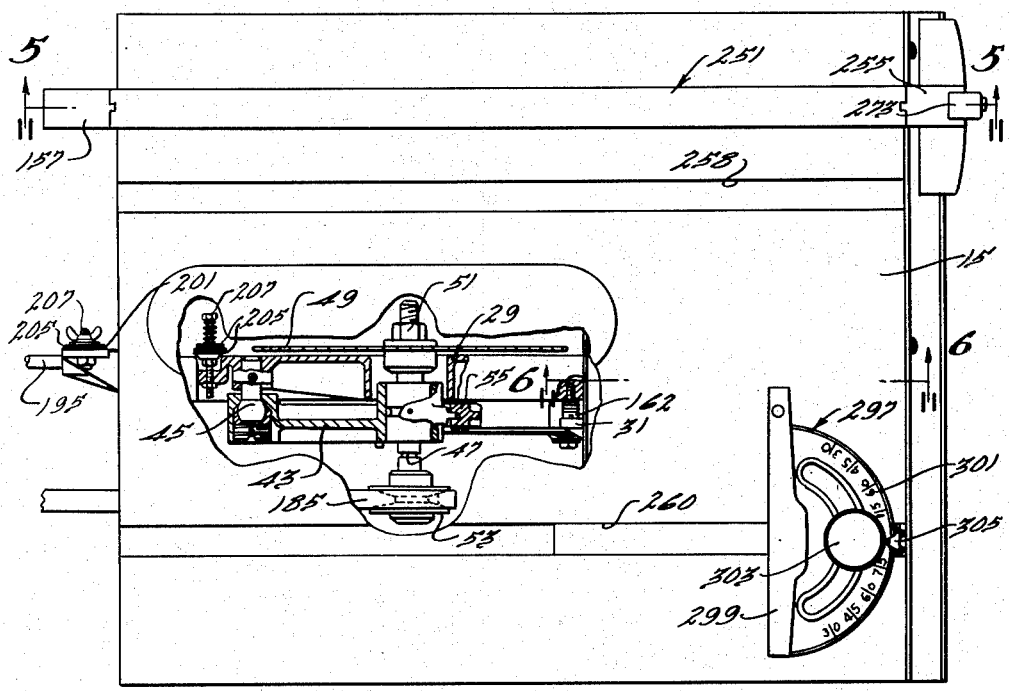
Fig. 4 is a top elevational view of the arbor saw, with parts broken away for purposes of clarity.

Referring now to the drawings and more particularly to Figs. 1 to 12 inclusive, it will be seen that the arbor saw includes a flat work table or table top 15, which is supported on a supporting surface 17, such as a work bench or the like, by means of a suitable box-like frame work structure 19, which includes a base 21, opposed side walls 23, and front wall 25. A tilt frame or cradle member 29 is supported below the table top 15, for oscillation transversely of the table top about an axis extending from front to rear of the table 15, by means of longitudinally spaced trunnions 31, in which arcuate hub like projections 33 of the cradle member are journalled. The trunnions 31 are rigidly connected to the underside of the table top by means of bolts 32. A mounting bracket 35, for a saw blade guard 37 which will be hereinafter described in detail, is connected to the back face of the cradle member 29 by means of bolts 39 and a bolt 41 which extends through a spacer 42, journalled in the rear trunnion 31, and is threaded into the rear hub 33 of the cradle member 29 so that the bracket 35 will oscillate with the cradle 29.

A bell crank member 43 is pivotally connected to the cradle 29 at 45, adjacent the rear end thereof. A saw blade arbor 47 is journalled in the upper horizontal arm of the bell crank 43, adjacent the front end thereof, and has a circular saw blade 49 drivingly connected thereto, on one side of the bell crank 43, by suitable means including a nut 51. A portion of the saw blade 49 projects upwardly through an elongated slot 50 in the usual insert in the table top 15. A belt pulley 53 is drivingly connected to the arbor 47 on the opposite side of the bell crank 43. The extreme forward end of the upper arm portion of the bell crank 43 is arcuately shaped and slidably engages an arcuate guide shoe 55, which is connected to the cradle 29 by any suitable means such as bolts or cap screws 57. An internally threaded block 61 is rotatably supported in the lower end of the bell crank member 43 by means of a block pin or shank portion 63 which extends through an aperture or bore 65 in the bell crank and is secured thereto against axial movement by means of a snap ring 67.

The rear end of a shaft 71 is threadably connected to the block 61 while the front end of the shaft 71 is universally connected to the cradle 29, at 73, the shaft therefore being entirely supported by the cradle. A spherically shaped ball element 75 is fixed to the shaft 71 and is disposed in a cradle socket which is formed by a semi-spherical recess 77 in the cradle 29 and a semi-spherically recessed cover plate 79 which is secured to the cradle by means of cap screws 81 which have springs 83 disposed between the heads thereof and the outer face of the cover plate 79. The front end of the shaft 71 is in this manner universally connected to the cradle 29 for a reason which will appear. The extreme front end of the shaft 71 is provided with a polygonal socket 85 for the reception of a complemental polygonal projection 87 on the rear end of an operating shaft 89. The rear end of the shaft 89 is connected to the cradle member 29 for both axial and rotatable movement, as can be best seen in Fig. 7. The rear end of the shaft 89 extends through an aperture or bore 93 in the cradle member 29 and is formed with a pair of longitudinally spaced annular grooves 95. A steel ball 97 is disposed in a horizontal passageway 99 in the cradle 29, adjacent the bore 93, and is yieldably urged into engagement with the periphery of the shaft 89 by means of a screw 101, carried by a rivet 102 and an offset flat spring 103 mounted on the outer face of the cradle 29. The ball 97 is adapted to be received in either of the spaced grooves 95 in the forward end of the shaft 89 so as to selectively and yieldably hold the shaft in one of the two axially spaced positions.

The forward end of the shaft 89 extends outwardly through, and is supported for rotatable and axial movement by, a vertical plate 105, which is rigidly connected to a forwardly projecting portion 107 of the cradle member 29, the shaft being therefore entirely supported by the cradle. The extreme forward end of the shaft 89 projects outwardly through an arcuate elongated slot 108 in the housing front wall 25 and carries a knob 109 thereon. When the shaft 89 is pushed inwardly or rearwardly the polygonal projection 87 on the rear end thereof will fit into the polygonal socket 85 in the forward end of the shaft 71. When the knob 109 is turned, the shaft 71 will be rotated and due to its threaded engagement with the lower end of the bell crank 43 will cause the bell crank to turn about its pivot 45 so as to cause the upper portion of the horizontal arm portion thereof to move upwardly or downwardly along the guide shoe 55, and thereby raise or lower the saw blade arbor 47. Stop nuts 111 are threaded onto the rear portion of the shaft 71, on each side of the bell crank block 61, so that the maximum amount of vertical movement of the arbor in either direction can be limited. Pivoting movement of the bell crank 43 will cause the rear end of the shaft 71 to move upwardly and downwardly a small amount, and this latter movement is permitted by the universal mounting of the front end of the shaft, as previously described.

An indicator or scale 115 is provided immediately behind the slot 108 in the front wall 25 of the arbor saw housing for cooperating with a pointer 117 which is mounted on the plate 105, to indicate the height of the saw blade above the table top. The indicator or scale 115 is mounted on the front arcuate face 119 of an elongated and somewhat angularly shaped indicator arm 121. The arm 121 is pivotally connected, intermediate its ends, to the cradle 29, at 123, and the rear end of the arm 121 is formed with an elongated slot 125 for the sliding reception of a pin 127 which projects outwardly from the bell crank 43. Therefore, as the bell crank 43 is pivoted, by the movement of the shaft 71, the pin 127 will ride in the indicator arm slot 125 and cause the indicator arm to move about its pivot 123, thereby varying the position of the scale 115 relative to the pointer 117, so as to indicate to the operator the position of the arbor and saw blade relative to the table top.

A spur gear 131 is carried by the shaft 89, forwardly of the annular grooves 95, and is adapted to mesh with the large gear 133 of a gear cluster 135, when the shaft is pulled outwardly or forwardly so that the ball 97 engages the rearmost groove 95 on the shaft. The gear cluster 135 is rotatably supported on the cradle member 29 by means of bolt and nut 137 and suitable bearings. The small gear 139 of the gear cluster 135 meshes with an arcuate rack 141 which is formed integrally with, or connected to, the front cradle trunnion 31. Therefore, when the knob 109 is rotated, with the shaft in its forwardmost axial position so that the gear 131 meshes with the gear 133, the small gear 139 will roll along the rack 141 so as to oscillate the cradle 29 and tilt the arbor 47 and the saw blade 49 relative to the table top. The amount of angular tilt of the arbor is indicated by the position of a pointer 143, which is connected to the plate 105 and projects outwardly through the arcuate slot 108 in the front wall 25, with respect to a scale 145 which is mounted on the outer face of the housing front wall 25, below the knob 109.

A mechanism 147 is provided to releasably retain the cradle in any adjusted position. This mechanism includes a bolt 149, the rear end of which extends through an arcuate slot 151 in the front trunnion 31 and is threaded into the cradle member 29 at 153. A lock nut 155 is threaded on the rear end of the bolt 149. A spring 157 is sleeved on the bolt and one end thereof abuts the head of the bolt while the other end abuts a washer 159. A washer-like pad 161 is sleeved on the bolt between the washer 159 and the front face of the front trunnion. The pad 161 is resiliently held in frictional engagement with the trunnion by the spring so as to releasably retain the cradle against accidental movement relative to the trunnions and table top. The force exerted by the spring can, of course, be varied by threading the bolt inwardly or outwardly relative to the cradle. In this way, a simple means is provided to prevent accidental movement of the blade and cradle. An adjustable stop 162 is carried by the cradle for engaging one of the trunnions 31 when the saw blade 49 is perpendicular to the table 15. As the cradle only tilts in one direction, the stop 162 provides a quick and positive means for accurately determining when the saw blade is in its perpendicular position.

It will thus be seen that the arbor 47 can be independently tilted and vertically moved, relative to the table top, by means of a single hand-operated shaft 89, which may be selectively positioned so as to engage either the gear 133 for tilting the cradle 29, or the forward end of the shaft 71 for raising and lowering the arbor.

Mounted on the supporting surface 17, rearwardly of the base 21 of the arbor saw, are a pair of transversely spaced brackets 167, which support the opposite ends of a shaft 169. An elongated cylindrical bearing 171 is carried on the shaft 169. A suitable drive motor 175 is secured to the upper face or plate portion 176 of a motor mounting bracket 179, by means of bolts 177. The bracket 179 is provided with straps 178, adjacent each end of the plate portion 176, which are reversely bent around the bearing 171 and secured to the upper face or plate portion 176 by means of bolts 181. The bracket 179 is, therefore, clamped around the outer periphery of the bearing 171, and the bearing can move both rotatably and axially relative to the shaft 169. The motor 175 and bracket 179 are tilted forwardly to permit a belt 185 to be connected around the motor pulley 187 and the pulley 53 on the saw blade arbor 47. After the belt has been connected between the motor pulley and arbor pulley, the motor 175 is tilted rearwardly and will be supported in the position shown in Fig. 1, by the belt 185 so as to retain the belt under tension and insure a positive drive to the arbor and saw blade. A plate 191 extends angularly upwardly from the motor mounting bracket 179 and has a slot 193 adjacent the upper end thereof through which a rod 195, which projects rearwardly from the cradle bracket 35, slidably extends. The rod 195 provides a positive connection between the cradle 29 and the bracket 179, so that as the cradle is oscillated or tilted the rod 195 will move the plate 191 and bracket 179 transversely along the shaft 169, so as to maintain the proper driving connection between the pulley belt 185 and the motor pulley 187 and arbor pulley 53 at all times, irrespective of the position of the cradle 29. That is, the motor pulley 187 and the arbor pulley 53 are maintained in substantial alignment, even though there may be a slight twist in the pulley belt because of the angular tilt of the cradle.

A fin or splitter member 199, is provided for releasably connecting the saw blade guard 37 to the mounting bracket 35. The splitter member 199 is formed with depending plate portions 201, each of which has a slot 203 in the lower end thereof. The slotted vertical portions 201 are inserted down into the guard mounting bracket 35 and cradle 29 and are releasably connected to each of these members by means of spring loaded friction buttons 205, carried on screws or bolts 207. The saw blade guard member 37 is of an inverted channel shape and is disposed over the saw blade 49 so as to protect a user from injury by the rotating saw blade. The guard 37 is movably connected with the forward end of the splitter 199 by means of a binder bolt 225 which extends through the splitter and outwardly through elongated angularly extending slots 226 in the opposed side walls of the guard. Flanged spacer bushings 227 are carried by binder bolt 225 adjacent the opposite ends thereof so that the flanged portions thereof slidably engage the outer faces of the opposed side walls of the guard 37, while the shank or hub portions thereof extend through the slots 226 in the guard. Flanged bushings 229 are carried by the binder bolt 225 on each side of the splitter, with the flanged portions thereof abutting against the opposite side faces of the splitter. A pair of depending kick back fingers 233 are journalled on each of the bushings 229 and each finger terminates at its lower end in a front point or prong 235 and a rear point or prong 237. The rear point 237 extends below the front point 235 for reasons which will hereinafter appear. A spring 239, having interconnected longitudinally spaced coil portions, surrounds the hub portions of each of the bushings 229, and has its coil portions disposed on opposite sides of the splitter 199 and inwardly bent end portions 241 which engage the upper ends of the kick back fingers 233 so as to resiliently urge the latter in a counter-clockwise direction of rotation as viewed in Fig. 3. The binder bolt 225 secures the bushings 227 and 229 and the kick back fingers in the proper positions, so that the guard 37 can move upwardly and downwardly relative to the splitter 199 and the binder bolt. Rearwardly of the binder bolt 225 a pair of opposed frusto-conically shaped buttons 217 are adjustably connected to the opposed side walls of the guard 37 by means of screws 219. Springs 221 are disposed between the outer faces of the buttons 217 and the inner faces of the side walls of the guard 37, so as to retain the buttons in sliding engagement with the splitter 199, and thereby guide the guard for vertical movement relative to the splitter and prevent any side play between the splitter and guard during such movement.

When a piece of wood is being pushed by an operator rearwardly into and past the saw blade 49, so as to raise the front end of the guard 37, the wood piece will engage the lower tooth ends of the kick back fingers 233 and rotate the same clockwise against the action of the spring 239. If, however, the saw blade hits a knot or the like in the wood, so as to tend to kick back the wood piece, toward the operator, the lower pointed end 237 of each of the kick back fingers 233, will dig into the wood piece and prevent it from moving forward relative to the saw blade and injuring the operator.

Extending from front to rear across the table top 15 is a fence 251 which includes an elongated box-shaped member 253, connected at its forward end to an end member 255 and at its rear end to an end member 257. The end members 255 and 257 are rigidly interconnected and held in engagement with the opposite ends of the elongated box-shaped member 253 by means of a rod 259 which extends through the box-shaped member 253 and is connected to each of the end members by any suitable means. The elongated box-shaped member 253 and the end members 255 and 257 rest upon and are adapted to be moved transversely across the top of the table top 15. In order to maintain the opposite side faces of the elongated fence member 253 in a parallel relationship with respect to the saw blade 49 and parallel grooves 258 and 260 in the table top, which are used in a manner which will hereinafter appear, a channel-shaped rail 261 is secured to the front face of the table top 15 and slidably receives therein a fence guide member 263. A pair of transversely spaced spring pressed plungers 265 are carried in the fence guide member 263 and are resiliently urged into engagement with the inner face of the outside wall of the rail 261, so as to maintain the back face of the fence guide member in yieldable but positive engagement with the front face of the table top. The fence guide member 263 is connected to the fence end member 255 by any suitable means such as screws 267, so that when the fence 251 is moved transversely across the table top, it will be maintained in its proper relationship with respect to the table top grooves 258 and 260, and the saw blade 49 the sliding engagement of the fence guide member 263 with the front face of the table top.

Figure 5:
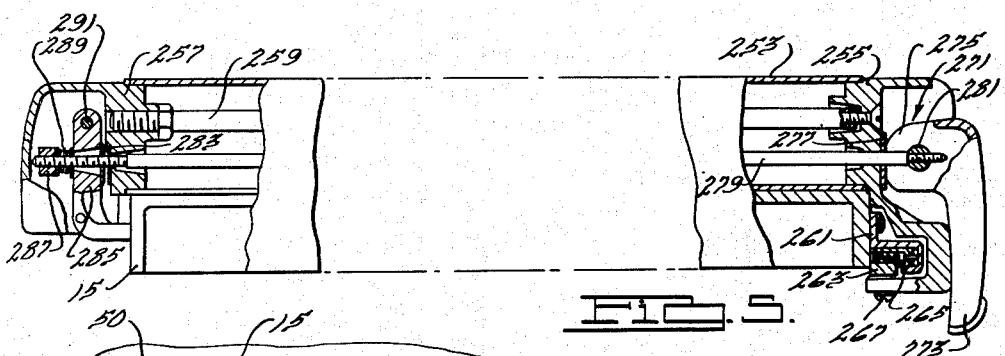
Fig. 5 is an enlarged sectional view of the structure illustrated in Fig. 4, taken along the line 5—5 thereof.
Figure 6:
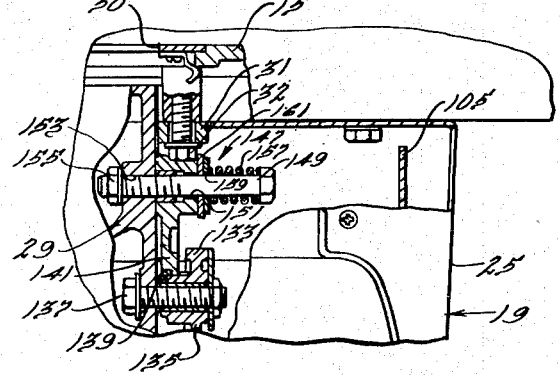
Fig. 6 is an enlarged sectional view of the structure illustrated in Fig. 4, taken along the line 6—6 thereof.

In order to releasably retain the fence 251 in any desired position on the table top, a lock or retaining mechanism 271 is provided, which includes a handle 273 having a cam nose 275 thereon, which is adapted to engage a plate 277 secured to the front face of the fence end member 255, above the guide member 263. One end of a rod 279 is threadably connected to a pivot pin 281 for the handle 273 and the rod extends rearwardly through the elongated channel-shaped member 253, the end member 257, a guide arm 285, and an inverted U-shaped spring 283, between the arm and end member 257. A nut 287 and spring 289 are carried on the rear end of the rod 279 and engage the back face of the arm 285. The upper end of the arm is pivotally connected to the fence end member 257 by pivot pin 291, so that the lower end thereof can pivot into and out of engagement with the back edge of the table top. When the handle 273 is rotated clockwise or downwardly, as illustrated in Fig. 5, the cam nose 275 engages the end member plate 277 and tightens the nut 287 and washer 289 against the guide arm 285, so as to cause the lower end thereof to engage the back face of the table top 15 and so as to compress the spring 283 between the arm and the end member 257. When the handle 273 is raised, so that the cam nose 275 moves out of engagement with the fence end member 255, the lower end of the arm 285 will move out of engagement with the back face of the table top 15, and the fence 251 can be moved transversely across the table top 15, in parallel relationship with the saw blade 49. After the fence has been moved to a desired position, it may be releasably held in this position by the downward rotation and locking of the handle 273.

A mitre gauge 297 is mounted in one of the table top grooves 258 or 260, and includes guide face portion 299, and a protractor type scale 301. A hand knob 303 is provided, which may be actuated so as to permit the mitre gauge 297 to be rotated to any desired angle with respect to the grooves and saw blade, as indicated by the position of the scale relative to a pointer 305, which is mounted on the table top. The hand knob 303 can be tightened to maintain the gauge in any desired angular relationship with respect to the plate, so that bevelled or mitred edges may be cut on a work piece.

Figure 13:
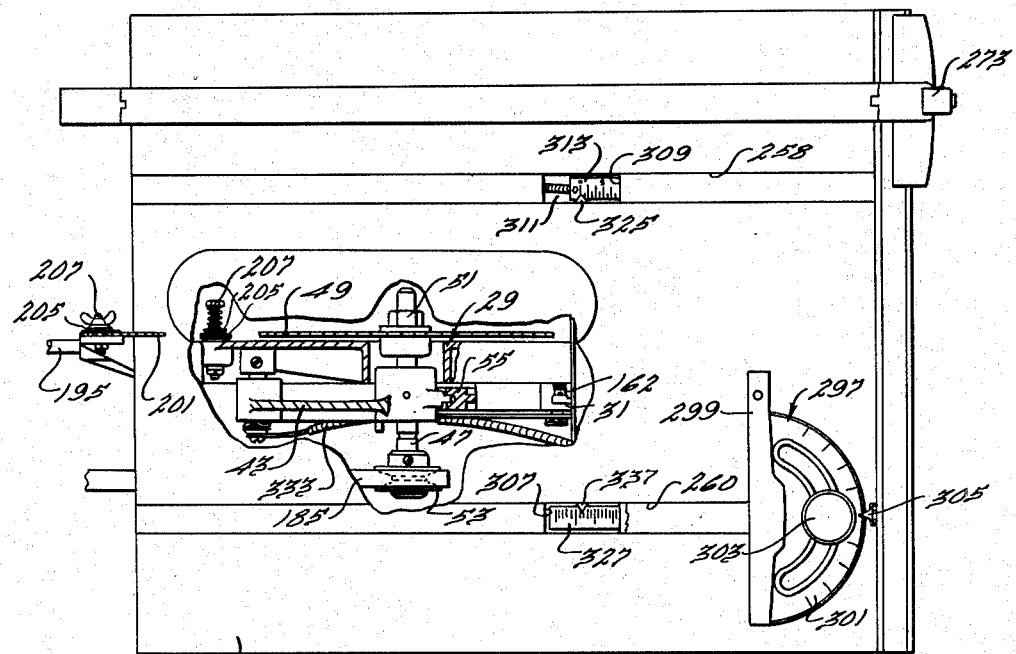
Fig. 13 is a top elevational view of an arbor saw, similar to Fig. 4, and illustrating a modification of the invention.
Figure 14:
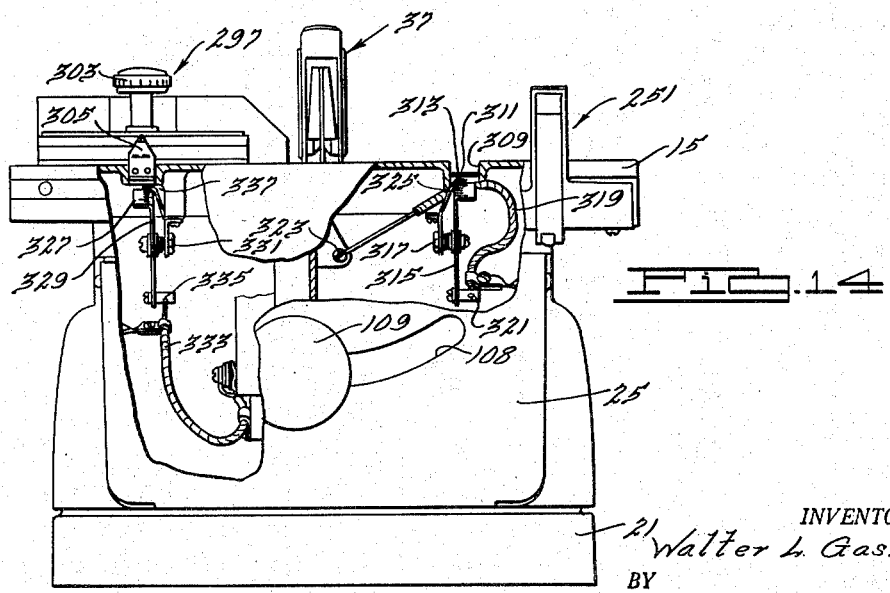
Fig. 14 is an end elevational view of the structure illustrated in Fig. 13, with parts broken away for purposes of clarity.

In the embodiment of the invention illustrated in Figs. 13 and 14, the construction of the arbor saw is identical with that previously described, except for the arrangement of the indicators or scales for determining the angular and vertical positions of the saw blade. As can be seen in Figs. 13 and 14, the table top grooves 258 and 260 are provided with elongated openings 309 and 307, respectively, in which transparent windows 311, such as glass, plastic or the like, are inserted. Disposed below the opening 309 is an indicator scale 313 for indicating the angular position of the arbor and saw blade 49. The indicator scale 313 is provided on the upper end of an arm or bracket 315, which is pivotally connected, intermediate its ends, to the table top 15 at 317. The lower end of the arm 315 is connected to one end of an operating cable 319, at 321. The opposite end of the cable 319 is connected to the cradle 29 at 323, so that as the cradle is oscillated or tilted it will actuate the cable 319 and pivot the indicator arm 315 relative to the table top, and to a pointer 325 which is connected to the table top, so as to indicate the angular position of the cradle on the indicator scale 313. Disposed below the table top opening 307 and window 311, is an indicator scale 327 for indicating the vertical position of the saw blade relative to the table top. The scale 327 is mounted on the upper end of an indicator arm 329, which in turn is pivotally connected, intermediate its ends, to the table top at 331, and has its lower end connected to an operating cable 333, at 335. The opposite end of the cable 333 is connected to the bell crank member or arm 43, so that as the bell crank arm is pivoted to vertically move the saw blade, the cable 333 will be actuated so as to cause the indicator arm 329 to be pivoted and thereby vary the position of the indicator scale 327 relative to a pointer 337 connected to the table top.

The indicator scales, by means of which the vertical and angular positions of the saw blade are determined, can thus be viewed from the top of the arbor saw, and the user thereof does not need to bend or stoop down in order to see the scales, mounted on, or adjacent to, the front face of the saw, below the table top, as in most conventional saws of this type.

It will thus be seen that the arbor saw illustrated in the drawings is extremely simple in construction and inexpensive to manufacture, and is constructed and arranged so as to be as easily operable by a user as possible. The combined advantages of this saw thus aid in the provision of a tilting arbor saw which is far superior to any now known in the art.

What is claimed is:

1. An arbor saw including a table top having a saw blade slot therein, means forming a support for said table top, an arbor disposed below said table top for supporting a circular saw blade so that a portion thereof will project upwardly through the slot in said table top, a cradle member connected with said table top for oscillation transversely of the slot therein, a bell crank member pivotally connected to said cradle member and rotatably supporting said arbor, a shaft threadably connected with one portion of said bell crank and rotatably supported on said cradle member so that rotation thereof will vary the vertical position of said arbor, gear means connected with said table top, gear means rotatably supported on said cradle member and meshing with said table top gear means, an operating shaft connected to said cradle member for rotatable and axial movement, and means on said operating shaft for selectively engaging said cradle member gear means and said bell crank actuating shaft upon axial movement of said shaft whereby said operating shaft may be axially moved to one position for actuating said bell crank shaft and varying the vertical position of said arbor, and to a second position for engaging said cradle gear means and oscillating said cradle member and tilting said arbor relative to said table.

2. An arbor saw including a table top having a saw blade slot therein, means forming a support for said table top, an arbor disposed below said table top for supporting a circular saw blade so that a portion thereof will project upwardly through the slot in said table top, a cradle member connected with said table top for oscillation transversely of the slot therein, a bell crank member pivotally connected to said cradle member and having one portion thereof rotatably supporting said arbor, a shaft having one end thereof threadably connected with another portion of said bell crank member, means universally connecting said shaft to said cradle member so that rotation thereof will pivot said bell crank member and vary the vertical position of said arbor, gear means connected with said table top, gear means rotatably supported on said cradle member and meshing with said table top gear means, an operating shaft connected to said cradle member for rotatable and axial movement relative thereto, means on said operating shaft for selectively engaging said cradle member gear means and said bell crank actuating shaft, whereby said operating shaft may be axially moved to one position for actuating said bell crank shaft and varying the vertical position of said arbor and to a second position for engaging said cradle gear means and oscillating said cradle member and tilting said arbor relative to said table.

3. An arbor saw including a table top having a saw blade slot therein, means forming a support for said table top, an arbor disposed below said table top for supporting a circular saw blade so that a portion thereof will project upwardly through the slot in said table top, a cradle member disposed below said table top, slotted trunnion means connected to said table top and supporting said cradle member for oscillation transversely of said table top slot, a bell crank member pivotally connected to said cradle member and rotatably supporting said arbor, a shaft threadably connected with one portion of said bell crank and rotatably supported on said cradle member so that rotation thereof will vary the vertical position of said arbor, gear means connected with one of said trunnion means, gear means rotatably supported on said cradle member and meshing with said trunnion gear means, an operating shaft connected to said cradle member for rotatable and axial movement, means on said operating shaft for selectively engaging said cradle member gear means and for alternatively engaging said bell crank actuating shaft, whereby said operating shaft may be axially moved to one position for actuating said bell crank shaft and varying the vertical position of said arbor, and to a second position for engaging said cradle gear means and oscillating said cradle member and tilting said arbor relative to said table, and brake means for releasably retaining said cradle in an adjusted position against accidental displacement relative to said table top, including a take up shaft having one end thereof extending through an elongated slot in said trunnion means and the other end threaded to said cradle member and resilient friction means forced by the shaft against the trunnion means.

4. In a tilting arbor saw or the like having a box-like frame open on top, a table plate secured to the top of said frame, a tiltable support member, trunnions rigidly secured to the front and rear of said plate and mounting said support member on the table for tilting about a horizontal axis extending from front to rear of said plate, an arbor carrying member movably supported on the support member and having an arbor receiving portion that is vertically movable with respect to said support member and said plate, a first adjusting shaft carried entirely by said support member and extending out of the front of said frame and being there provided with an actuating handle, means mounting said shaft on said support member for rotation and for axial movement between a first position and a second position, a first rotatable adjusting means acting between said arbor carrying member and said support member and operatively engaged by said shaft when said shaft is in said first position and disconnected therefrom when said shaft is in said second position, a second rotatable adjusting means acting between said support member and said table plate and operatively engaged by said shaft when said shaft is in said second position and disconnected therefrom when said shaft is in said first position, said shaft and said first and second adjusting means being carried entirely by said table plate and being independent of said frame.

5. In a tilting arbor circular wood saw, a box-like sheet metal casing open on top, a table plate affixed to said casing on top thereof, front and rear tilt trunnions rigidly secured to said plate, a tilt frame member below said plate and mounted on said trunnions for tilting about an axis substantially parallel to said table plate, an arbor arm member movably mounted on said frame for movement toward and away from said plate, an adjusting shaft operatively connected to the tilt frame member so that rotation of the shaft tilts the frame, an adjusting shaft operatively connected to the arbor arm member so that rotation of the shaft moves the arm, both said shafts being carried solely by said tilt frame and tiltable therewith and being independent of said casing, one of said shafts being axially movable and carrying a handle for moving it axially and rotatively, means whereby axial movement of said shaft and handle operatively connects said handle with and disconnects it from the other shaft, and means whereby said one shaft is disconnected from its member when said handle is connected to the other shaft.

References Cited in the file of this patent

UNITED STATES PATENTS

| Number | Name | Date |
|---|---|---|
| 807,788 | Stetler | Dec. 19, 1905 |
| 866,782 | Geisendorfer | Sept. 14, 1907 |
| 1,123,711 | Driscoll | Jan. 5, 1911 |
| 1,774,243 | Scofield | Aug. 26, 1930 |
| 1,982,682 | Massee | Dec. 4, 1934 |
| 2,121,069 | Collins | June 21, 1938 |
| 2,140,323 | Lanskey | Dec. 13, 1938 |
| 2,168,282 | Tautz | Aug. 1, 1939 |
| 2,211,050 | Boice | Aug. 13, 1940 |
| 2,265,335 | Aumann | Dec. 9, 1941 |
| 2,590,035 | Pollak | Mar. 18, 1952 |